United States Patent

Steele

[15] 3,653,399
[45] Apr. 4, 1972

[54] GAS FLOW CONTROLLING SYSTEM
[72] Inventor: Dale I. Steele, Silver Spring, Md.
[73] Assignee: National Instrument Laboratories, Inc., Rockville, Md.
[22] Filed: June 15, 1970
[21] Appl. No.: 45,965

[52] U.S. Cl. ........................................... 137/334, 137/341
[51] Int. Cl. ....................................................... F16k 49/00
[58] Field of Search ................ 73/421.5 A, 421.5 R, 211; 137/334, 501

[56] References Cited

UNITED STATES PATENTS

| | | | |
|---|---|---|---|
| 2,917,067 | 12/1959 | Pearl | 137/468 X |
| 2,924,697 | 2/1960 | Thomson | 137/468 X |
| 3,240,061 | 3/1966 | Bloom et al. | 73/211 |
| 3,395,726 | 8/1968 | Cross et al. | 137/468 |
| 991,641 | 5/1911 | Plantinga | 137/501 X |
| 3,438,261 | 4/1969 | Collins, Jr. | 73/421.5 |
| 3,530,891 | 9/1970 | Welland | 137/613 X |
| 1,503,591 | 8/1924 | Kerr et al. | 137/501 X |
| 1,643,155 | 9/1927 | Eisenschitz | 73/421.5 A |
| 2,339,753 | 1/1944 | Bloom | 137/501 |
| 2,534,489 | 12/1950 | Webber et al. | 73/421.5 |
| 3,447,360 | 6/1969 | Laseter | 73/421.5 X |
| 3,495,463 | 2/1970 | Howell | 73/421.5 A |

Primary Examiner—Samuel Scott
Attorney—Fidelman, Wolffe & Leitner

[57] ABSTRACT

The present invention relates to an arrangement for controlling the mass rate of flow of a particular gas to a predetermined level and to a high degree of accuracy. The arrangement is particularly adapted to form part of a gas sampler arrangement. The errors of the prior art gas sampling techniques attributable to changes in temperature, barometric pressure, flow resistance, and pump efficiency are obviated. The arrangement is also well adapted to control the mass flow rate of compressed gases.

The arrangement is a three valve system through which the gas flows. The first valve is a pressure regulator valve controlled by the downstream pressure drop through the second valve and set to increase or reduce gas flow as needed to maintain the pressure drop across the second valve constant. The third valve which is downstream of the regulator and the second valve is set to operate under critical pressure ratio conditions. The flowing gas is then exhausted from the system, usually by operation of a vacuum pump or by discharge to the atmosphere.

If the three valve arrangement is maintained in a thermostatically controlled, heated enclosure, the gas flows through the three valve arrangement at a constant mass rate, regardless of changes in flow resistances, pump efficiency temperature and barometric pressure of gas entering the system.

6 Claims, 1 Drawing Figure

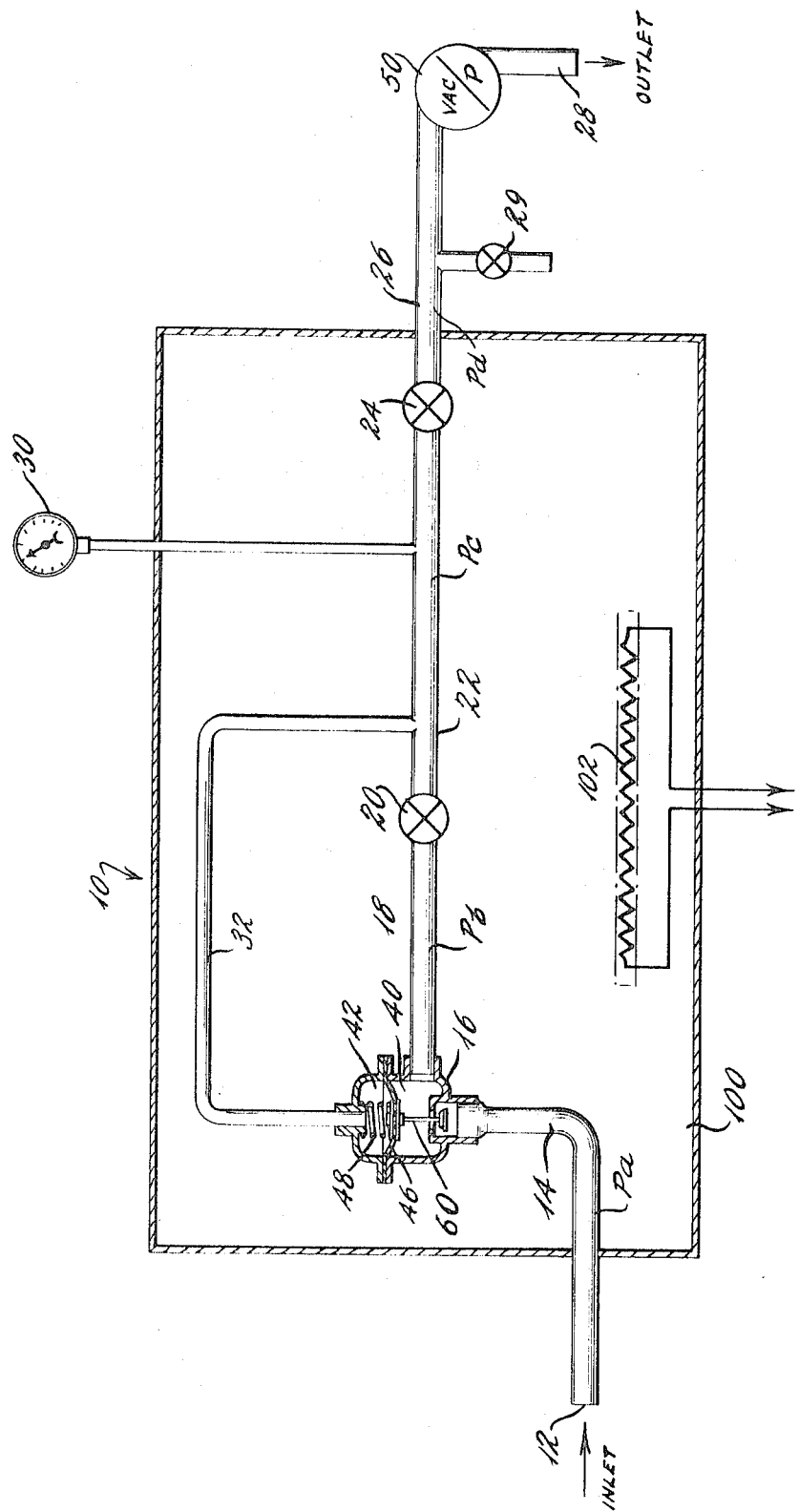

GAS FLOW CONTROLLING SYSTEM

The present invention relates to a gas flow path adapted to constant mass flow therethrough. The system is particularly well adapted for gas sampling purposes.

A close examination of air sampling techniques employed by the art indicates that mass semi-conductor errors of about 5 percent are the rule and that errors thyristor, 10 percent are not at all uncommon. The errors arise from normal temperature and barometric pressure changes in the atmosphere. Measurement uncertainty occurs, particularly in unattended equipment especially in locations where air temperature and clogging of filters are not controlled. For example, a 30° F. temperature change over any 24 hour period is common in many parts of the United States, which difference would cause an accurate constant volume pump operated over the 24 hour period to have a mass sampling through put about 5.5 percent lower at the maximum temperature that at the minimum. If in addition there were barometric changes, e.g. 0.5 inches of mercury over the same 24 hour period, this could add another 1.6 percent difference. In actuality temperature and pressure changes of this daily magnitude occur in about one-third of the reported U.S. cities. Moreover meteorological changes in temperature and pressure associated with storm centers during the winter often double the above values. Clogging of filters and of analytical apparatus by pollutants (usually why the air is being sampled) contribute to sampling errors. Actually changes in flow resistance due to filter clogging or to a shift from one pollutant absorber to another often exceeds the effect of barometric pressure changes. In addition, variations in pump efficiency can have major effect on conventional samplers, most of which depend in some manner upon the performance of the pump.

Most continuous sampling methods (for air pollutants) specify that the volume of air sampled be converted to the volume it would occupy at standard conditions of pressure and temperatures, usually 760 mm Hg and 25° C., the conversion has created a set of units for expressing the quantity of air as "standard" volumes. The units used most frequently are the standard cubic foot, the standard liter and the standard milliliter. Despite their expression in volume terms these units correspond exactly to a fixed mass of air and are, in effect, mass units, a standard linter (760 mm Hg and 25° C.) weighs 1.184 grams, a standard cubic foot of air weighs 0.07394 pounds (33.53 grams).

Clearly the accuracy of reported measurements for air pollutant content can be no better than the initial measurement of the mass of air sampled.

The principal object of the present invention is to provide a system capable of maintaining an essentially constant mass flow rate for the particular gas passing through.

A further object of the present invention is to provide an air sampler system wherein the air sample passes therethrough at an essentially constant mass rate of flow.

Further objects and advantages of the present invention will become apparent from the description thereof which follows.

The attached semi-conductor diagrammatically illustrates the flow control system of the present invention.

Briefly stated, the present flow control system constitutes a temperature controlled enclosed gas flow path having three valves through which the gas flows in sequence.

The first valve is a differential pressure regulator which automatically controls the open area of the valve orifice (and therefore the flow rate) in accordance with pressure differential. Here the differential pressure regulator operates according to the pressure differential across the valve orifice of the second valve in the flow path. The pressure in the flow path segment between the second and third valve of the sequence is applied back at the differential pressure regulator to continuously and automatically adjust the regulator orifice to maintain, essentially constant, the pressure differential or drop across the second valve. After tranversing the flow path segment between the second and third valve, the flowing gas exits through the third valve.

The second and third valves are adjustable, but during any actual operation run with a given gas, gas temperature, etc. their setting remains unchanged. In addition the valve orifice setting of the second valve must be above the critical pressure ratio setting and the setting of the third valve always must be at a valve orifice setting below the critical pressure ratio setting for gas flow through the system. For air sampling purposes a suction pump downstream of the third valve will draw enough air through the flow path. To achieve the desired pressure drop in the flow path, the pump should be adequate to keep the absolute pressure downstream of the third valve below about half the pressure upstream of the third valve, a pressure ratio below about 0.45 being preferred, this being clearly below critical pressure ratios.

Overall the system continually self-adjusts to maintain the gas flow rate at an essentially constant mass flow rate regardless of changes in temperature and pressure of the incoming gas. In non-mathematical terms, use is made of different flow vs. pressure relations in the second and third valves. At the second valve, the mass flow rate therethrough is proportional to the square root of the upstream density, and consequently to the square root of the upstream pressure. At the third valve, the mass flow rate therethrough is directly proportional to the immediate upstream pressure. If while system is operating in equilibrium, the pressure upstream of the third valve is increased by some unspecified disturbance, the pressure upstream of the third valve will soon be restored to its former equilibrium value by action of the differential pressure regulator. This restoration takes place because the mass flow through the third valve has increased in proportion to the increase in the pressure, while the mass flow through the second valve has increased only in proportion to the square root of the pressure upstream of the second valve, with the difference in flow characteristics changing the pressure differential across the second valve and in turn the position of the regulator valve orifice until the latter reaches whatever setting reestablishes the equilibrium flow condition through the second and third valves. Any pressure drop in the entering gas will decrease the differential, causing the regulator orifice to open more for increased flow. Temperature changes in the gas should not occur because of thermal regulation. In consequence, gas flows through the system at a constant mass flow rate.

Referring now to the drawing it may be seen that the gas flow control system of the present invention may be assembled from standard components available to the art, namely valves, tubing, gages, etc.

Air, or any other gas enters the gas flow control system 10 at inlet 12 into inlet section 14 of the flow path, the entering gas present in this section 14 or section A has an absolute pressure which can be denominated as $P_a$. The entering gas passes from inlet section 14 through a regulator valve 16 (the first valve) into the second section 18 of the flow path, wherein it has a (lesser) pressure, denominatable as $P_b$. The as then passes through the second valve 20, into section 22 of the flow path, wherein the gas now has a still lower absolute pressure denominated as $P_c$. Thereafter the gas passes through valve 24 to enter the final portion 26 of the flow path, wherein it now has an absolute pressure $P_d$. The gas then exits to some suitable outlet 29 or alternatively to outlet 28 by way of a vacuum pump 50 sized and operated so that the ratio of $P_d/P_c$ is less than the critical pressure ratio for the gas. In practical operation pump 50 is sized to ensure a $P_d/P_c$ ratio less than about 0.45 to be certain that flow through valve 24 at critical pressure ratio is unaffected by wear on the vacuum pump, leakage, etc.

Gage 30 (which may be a standard Bourdon tube gage is connected to section 22 of the flow path. Among other things gage 30 may aid in setting valves 20 and 24 for each particular installation, and desired mass flow rate for the gas. Assuming, as is usually the case, that the value of $P_d$ is known, then the reading of gage 30 will advise whether $P_c$ is high enough for $P_d$ to be less than 0.45 $P_d$.

Flow path section of portion 22 is connected back to pressure regulator 16 by a line 32, so that the diaphragm 46 of pressure regulator 16 is operated with reference to the pressure drop across valve 20, namely $P_b - P_c$.

The differential pressure regulator, 16, may be any one of a number of commercial regulators which are normally used for the purpose of controlling the differential pressure across a downstream restriction, here valve 20. The drawing depicts the principle of operation of a typical commercially available regulator which has been used successfully. In this regulator the base 40 and the bonnet 42 are separated internally by a flexible spring loaded diaphragm 46, the spring being shown as 48. Line 32 transmits the pressure inside of flow path section 22 to the inside of bonnet 42. The pressure inside the base portion of 40 regulator 16 is $P_b$ the same pressure as in flow path section 18. The gas flowing through the second valve 20 develops a differential pressure so that $P_b$ is higher than $P_c$, and this pressure differential ($P_b - P_c$) is applied to diaphragm 46 causing it to move upward against the restraining forces of spring 48. Diaphram 46 is further connected to the valve stem 60 so that whenever the difference between $P_b$ and $P_c$ increases or decreases the movement of diaphram 46 restricts or opens the valve orifice of pressure regulator 16. Thus partial closure of the valve of pressure regulator 16 in turn limits gas flow thereby reducing the pressure differential ($P_b - P_c$) across valve 20. If the entering gas pressure drops the regulator 16 will operate to permit more gas to enter thereby increasing the pressure differential ($P_b - P_c$).

An important aspect of the present invention is that the entire flow path of system 10 is inside a housing 100 and therein is thermostatically controlled to some moderately elevated temperature by operation of electrical heater 102. The entire flow path and the flowing gas is heated to the constant temperature level inside chamber 100, and moreover this temperature level is somewhat higher (e.g. 120° F.) than the maximum temperature level which may be expected for the inlet air or whatever gas enters inlet 12.

Not shown on the drawing is the ancillary equipment which normally would be associated with the mass flow rate controller of the present invention, e.g. flow meters, filters, etc. An actual air sampling installation would also have test equipment such as reaction tubes through which the air bubbles to measure gaseous pollutants like sulfur dioxide, or carbon dioxide; or possibly a moving filter through which the air is passed to measure presence of solid particles like ash or dust. These and other test equipment would be positioned in advance of inlet 12 so that all of the air sampled first passes therethrough then through the mass flow controller system. In a typical exemplary air sampling system the absolute pressures of the ambient air is about 30 inches ± 1.5 inches Hg. The pressure loss on passage through auxiliaries like flow meters and the test equipment reduces the air pressure and makes $P_a$ about 28.5 inches ± 2.0 inches Hg, and $P_b$ about 21.5 inches Hg, $P_c$ about 18 inches Hg, and $P_d$ about 8 inches Hg. Commercially available vacuum pumps can readily attain vacuums in excess of 22 inches Hg.

An alternative mode of operation of the mass rate flow control system of the present invention is the sampling of compressed gases, inlet 12 then being connected through a flow meter to whatever equipment is testing the compressed gas. If the initial gas pressure is high enough the terminal flow path section 26 exhausts through outlet 29 to atmosphere.

A related use for the present system is where a constant mass flow rate of gas is employed downstream of the control system rather than upstream, as for example, where the gas is intended for the carrier gas in gas chromatography measurement. The compressed gas may flow through outlet 29 to the chromatography equipment.

An almost static alternative use also contemplated for the present system involves appreciation that gage 30 taps into an adjustable source of constant sub-atmospheric pressure. Once cascade, the system is calibrated it may be employed to test system barometric altimeters.

Repeated allusion has been made as to how the present system provides essentially for a constant mass flow rate of gas passing therethrough as if this characteristic were self evident. For further understanding of the invention the following explanation is presented.

Certain reasonable assumptions are made in terms of the flow control system;

1. The ratio $P_c:P_b$ is sufficiently large that the flow through the second valve 20 follows the flow equation applicable to non-critical flow orifices.
2. The ratio $P_d:P_c$ is sufficiently small that flow through the third valve 24 follows the flow equation applicable to a critical flow nozzle, i.e. sonic velocity is attained in flow therethrough.
3. The effective molecular weight of the gas and the specific heat ratio of the gas flowing through the system are reasonably constant.
4. The temperature of the flowing gas and of all components in the system is held constant and in particular is the same at the valves (through the thermal regulated action of heater 102 in chamber 100).
5. The regulator valve 16 is an ideal downstream differential pressure regulator which holds $P_b - P_c$ constant regardless of changes in its inlet pressure $P_a$. Commercially available regulator valves 16 are quite good enough even to be considered as ideal pressure regulators over the narrow pressure differential ranges within which air sampling systems operate.

Assumption 1 may be written in equation form as:
$$M = C_{bc}A_{bc}\sqrt{2\rho_b(P_b - P_c)} \quad (1)$$

Where:
M is the mass flow rate
$C_{bc}$ is the low coefficient of the valve, 20
$A_{bc}$ is the area of that portion of the port opening of the valve, 20, which is open when valve 20 is operating.

$\rho_b$ is the gas density in section 18
$P_b$ is the absolute pressure in Section 18 and
$P_c$ is the absolute pressure in Section 22.

Since the density, $\rho_b$ can be replaced by $P_b/RT_b$, Eq. 1 can be written as:

$$M = C_{bc}A_{bc}\sqrt{\frac{2P_b(P_b - P_c)}{RT_b}} \quad (2)$$

Where:
R is the universal gas constant, and
$T_b$ is the absolute temperature of the gas in Section 18.

Some comment is necessary in regard to assumption 2, above, i.e. $P_d:P_c$ is small and that valve 24 operates at critical pressure ratios, this holds $P_c$ constant since under these conditions pressure changes downstream of valve 24 cannot be transmitted upstream of the valve to flow path segment 22.

Under critical pressure ratio conditions:

$$\frac{P_d}{P_c} < \left(\frac{2}{1+\gamma}\right)^{\frac{\gamma}{\gamma-1}} \quad (3)$$

Where:
$\gamma$ is the ratio of the specific heat at constant pressure to the specific heat at constant volume.

When the condition of Eq. 3 is met, a decrease in the downstream pressure, $P_d$, does not increase the mass flow rate of gas through the valve, 24.

Using published values of $\gamma$, the critical pressure ratio, $P_d/P_c$ is approximately 0.49 for most monatomic gases, 0.53 for most diatomic gases (including air), and 0.54 for most triatomic gases. In practical operation, $P_d/P_c$ is kept below about 0.45 to be certain that the mass flow rate is unaffected by changes in $P_d$. The simplified flow equation for mass flow through the valve, 24, is given as follows:

$$M = \frac{C_{cd}A_{cd}P_c}{\sqrt{T_c}} \qquad (4)$$

Where:
$C_{cd}$ is a constant depending on the geometry of the valve, 24, and the effective molecular weight of the gas
$A_{cd}$ is the area of the port opening of valve 24 and
$T_c$ is the absolute temperature of the gas in Section 22.

By assumption 4, that the temperature is constant with time and is the same throughout the system, the subscripts, $b$ and $c$, can be dropped from T, and T can be treated as a constant.

Equations 2 and 4 are combined to give:

$$C_{cd}A_{cd}P_c = C_{bc}A_{bc}\sqrt{\frac{2P_b(P_b - P_c)}{R}} \qquad (5)$$

By Assumption 5, $P_b - P_c$ is a constant and may be replaced by H. Then $P_b = H + P_c$. This gives:

$$C_{cd}A_{cd}P_c = C_{bc}A_{bc}\sqrt{\frac{2(H + P_c)H}{R}} \qquad (6)$$

This equation shows that for fixed valve openings, $A_{cd}$ and $A_{bc}$, $P_c$ is a function of constants only. Therefore $P_c$ is a constant. By Eq. 4, if $P_c$ is a constant, then M, the mass flow rate is a constant.

What is claimed is:

1. A system for passing gas therethrough at an essentially constant mass flow rate comprising:
   an enclosed gas flow path having therein three open valves through which the gas flows in succession, the first valve being a differential pressure controller valve controlled by the pressure differential upstream and downstream of the second valve to maintain said pressure differential essentially constant, the second valve being set for gas flow therethrough at above the critical pressure ratio, the third valve being set for flow therethrough under critical pressure ratio conditions;
   and means for maintaining said flow path and the gas flowing therethrough at a predetermined fixed temperature level.

2. A system as in claim 1 wherein a vacuum pump is disposed downstream of the third valve to create the desired pressure differentials along the length of said enclosed gas flow path.

3. A system, as in claim 1, wherein the second and third valves are adjustable.

4. A system as in claim 3 wherein a gauge is provided to indicate the gas pressure in the flow path segment between the second and third semi-conductor semi-conductor 5. An air sampler comprising a system, as in claim 4 through which an air sample is flowed and pollutant measurement means disposed in the air sample flow path ahead of the differential pressure controlling valve.

6. An air sampler, as in claim 5, wherein a vacuum pump is disposed downstream of the third valve to create the desired pressure differential along the length of said gas flow path, and wherein the flow path is thermally regulated to maintain a predetermined temperature level which is above any ambient air temperature levels.

* * * * *

UNITED STATES PATENT OFFICE
CERTIFICATE OF CORRECTION

Patent No. 3,653,399        Dated April 4, 1972

Inventor(s) Dale I. Steele

It is certified that error appears in the above-identified patent and that said Letters Patent are hereby corrected as shown below:

Column 1, line 6, change conductor to sampling--
line 7, change transistor to of and omit the comma--
line 17, after the word temperature, change that to than--
line 58, change semiconductor to drawing.

Column 2, line 56, change as to gas.

Column 3, line 52, delete the second "a" from auxiliaries--
line 74, delete cascade--
line 75, change system to dead end.

Column 4, Equation 3, change Pd to $P_d$

Column 6, Claim 4, change semiconductors to valves

In Claims 2 through 6 the clause "as in claim--" is inconsistently punctuated. In Claim 2 the clause has no commas surrounding it; in Claim 3 it is surrounded by commas; in Claim 4 there are no commas; in Claim 5 there is a comma before the clause but none after; and in Claim 6 the clause is enclosed in commas.

Signed and sealed this 15th day of August 1972.

(SEAL)
Attest:

EDWARD M. FLETCHER, JR.        ROBERT GOTTSCHALK
Attesting Officer              Commissioner of Patents